Nov. 17, 1970          C. R. HUNTWORK          3,540,970
                         TIPPING MACHINE
Filed Dec. 5, 1967                          8 Sheets-Sheet 8

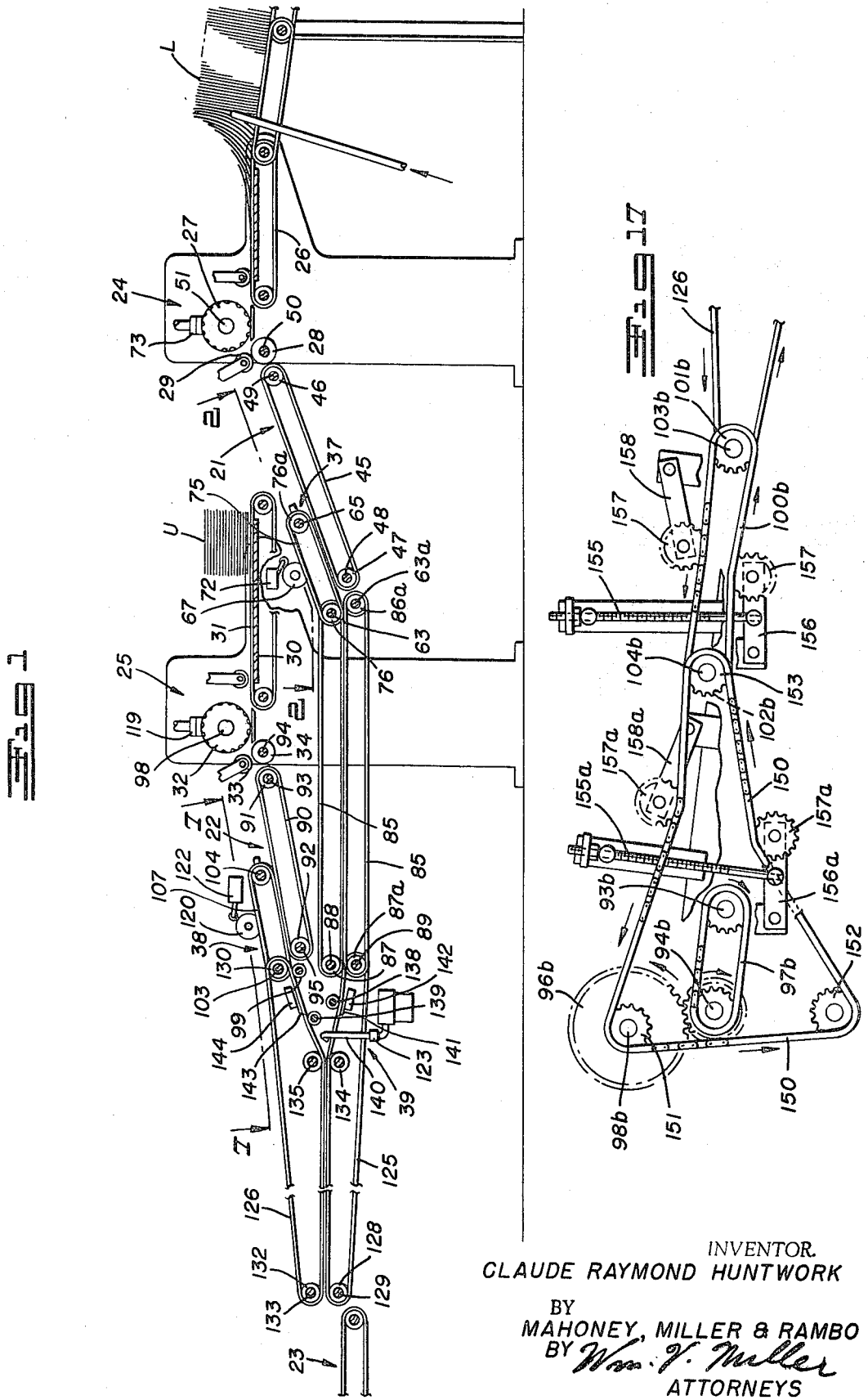

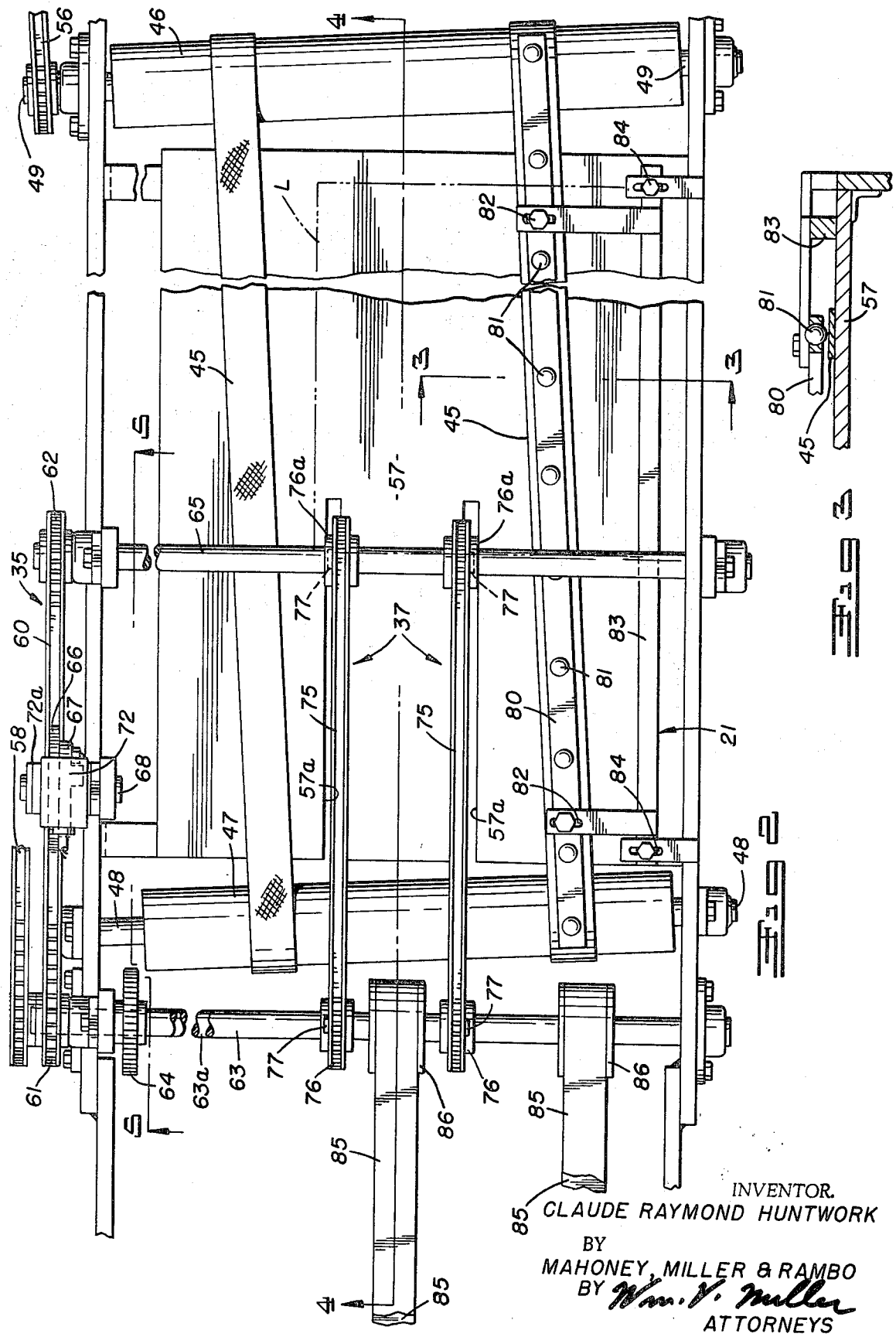

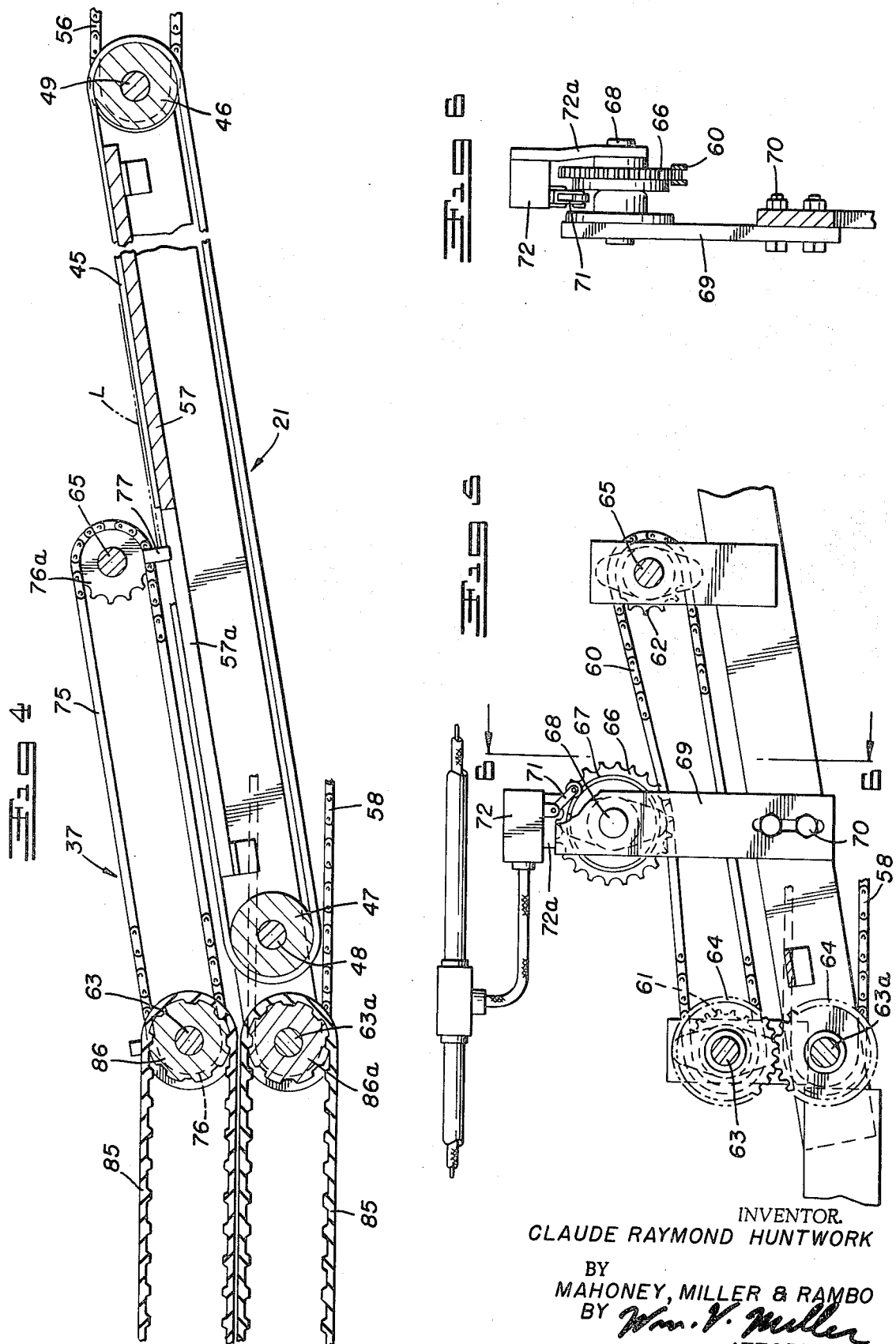

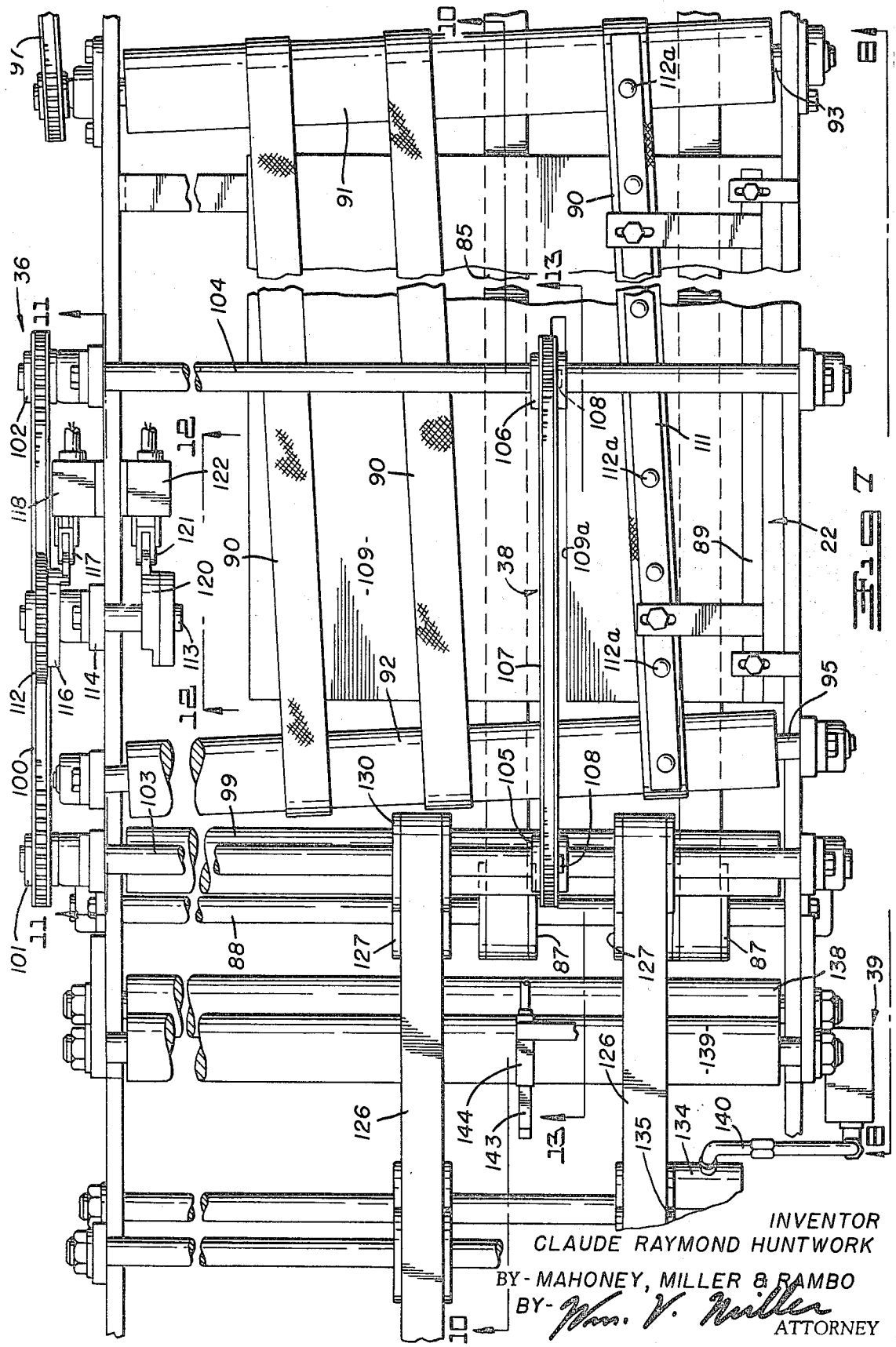

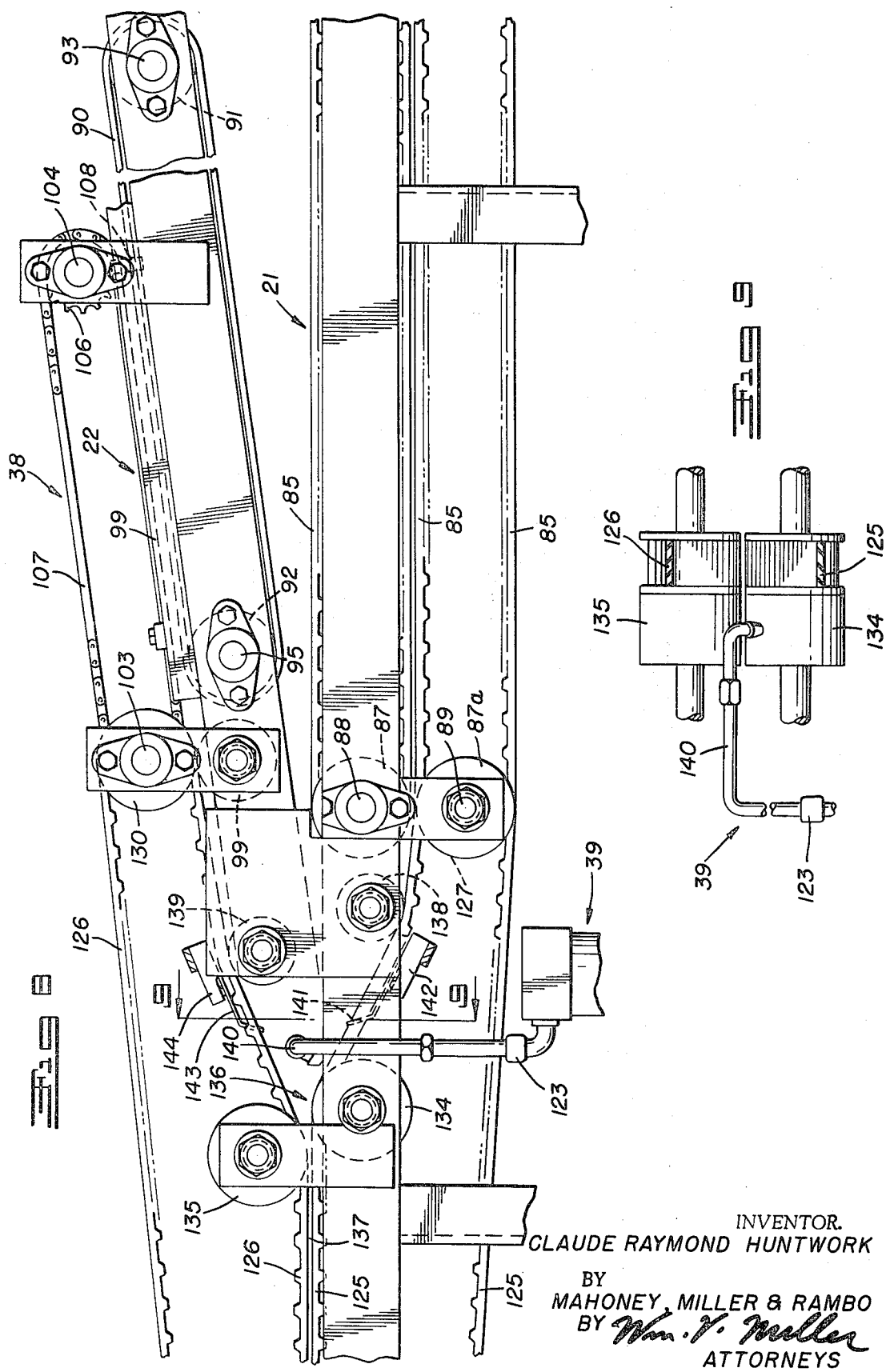

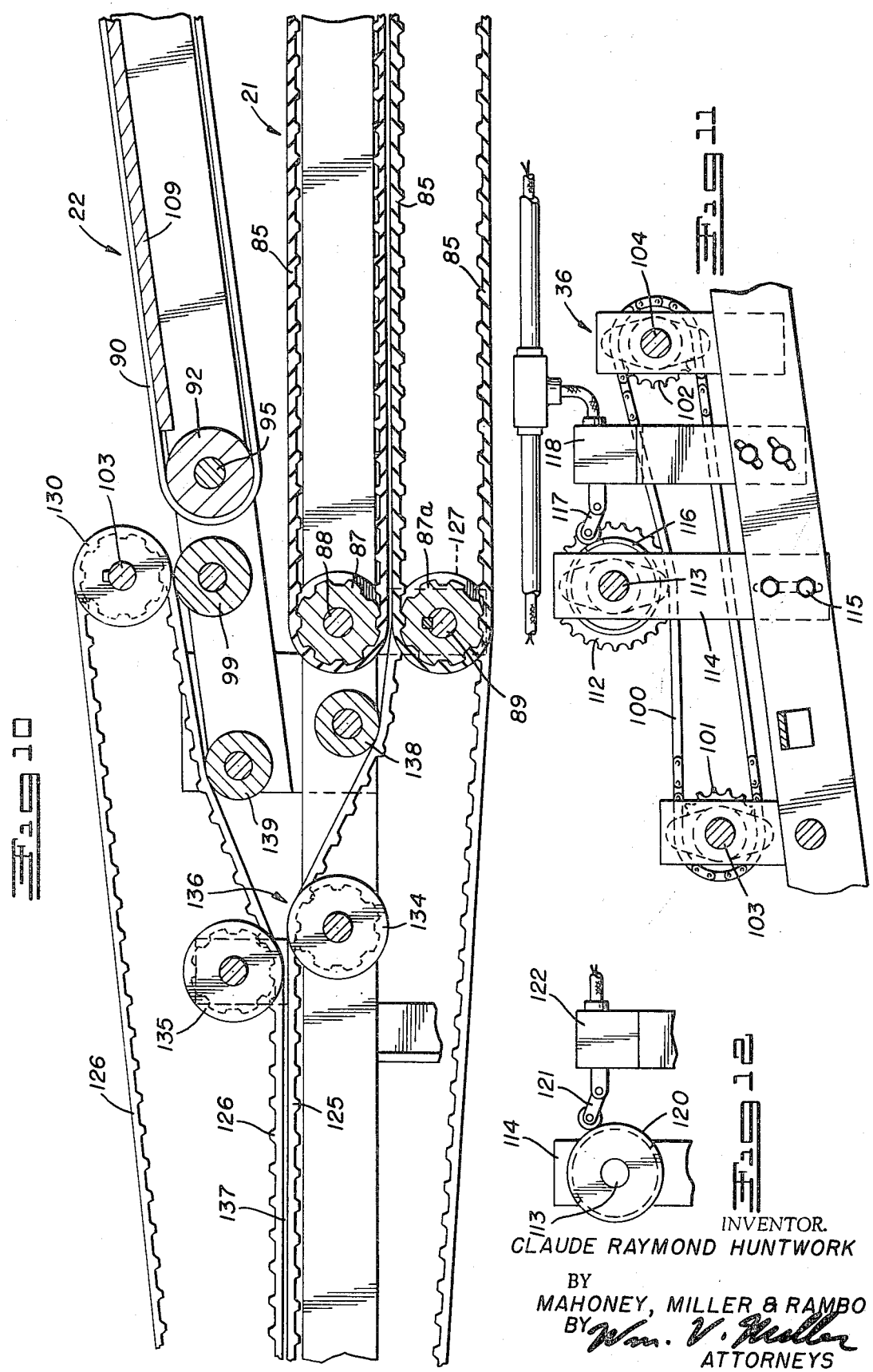

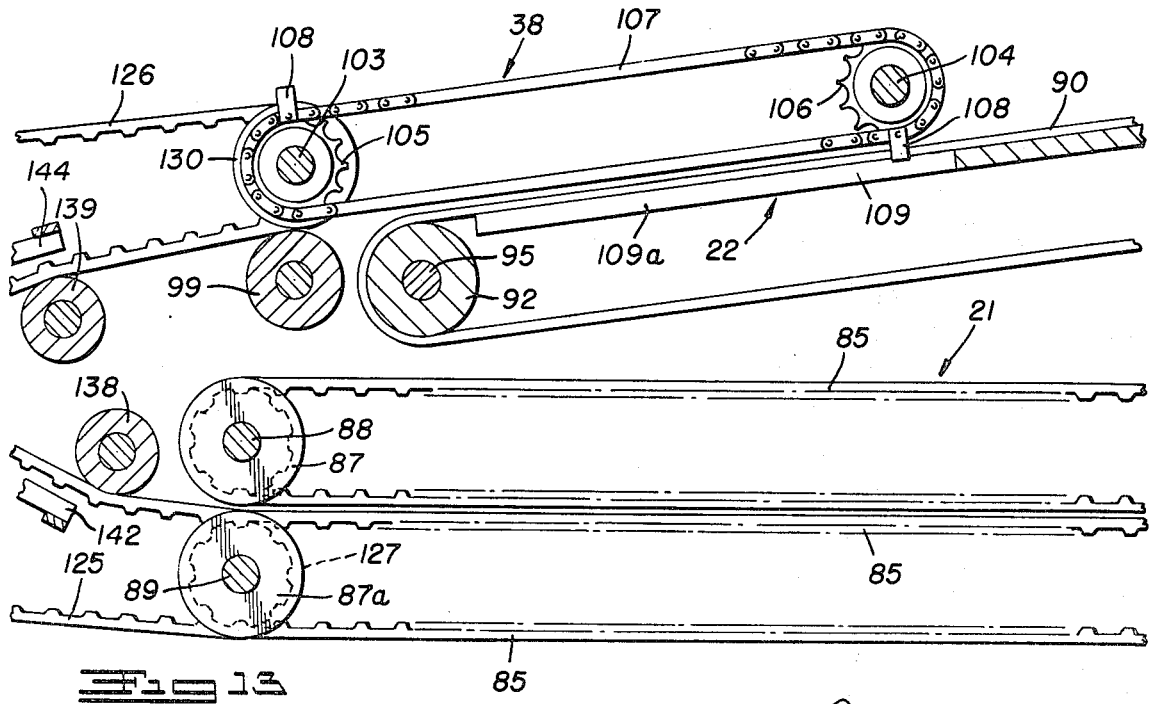
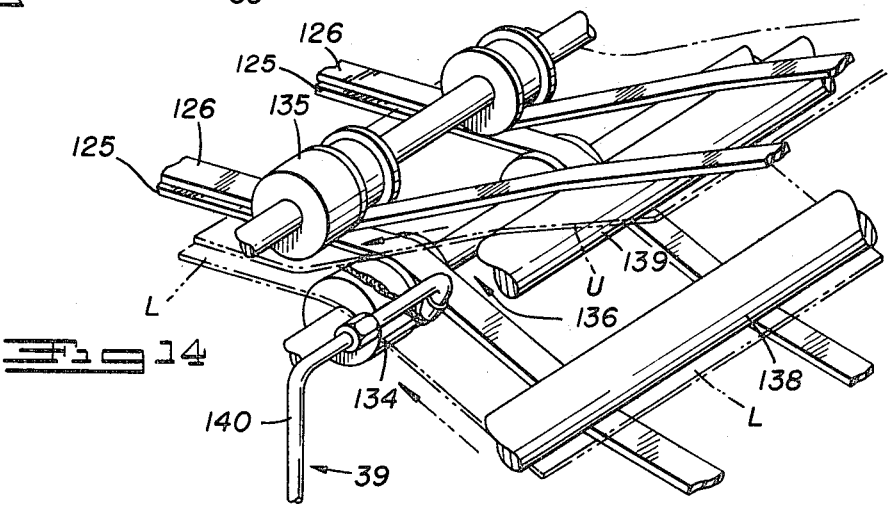
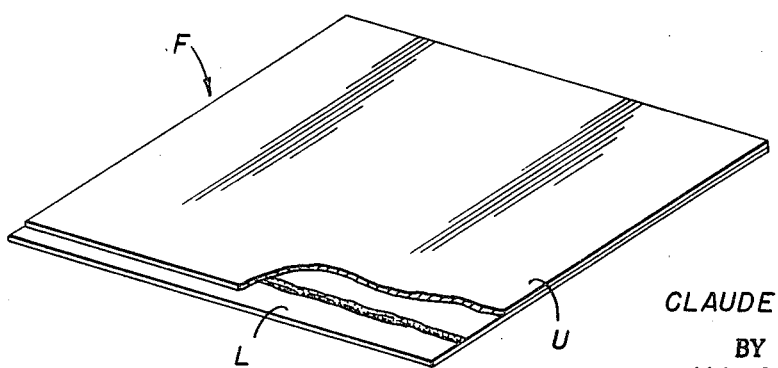

INVENTOR.
CLAUDE RAYMOND HUNTWORK
BY
MAHONEY, MILLER & RAMBO
BY
ATTORNEYS

United States Patent Office 3,540,970
Patented Nov. 17, 1970

3,540,970
TIPPING MACHINE
Claude Raymond Huntwork, Upper Arlington, Ohio
(2759 Brentwood Ave., East Lansing, Mich. 48823)
Filed Dec. 5, 1967, Ser. No. 688,225
Int. Cl. B65c *9/08;* B32d *31/12;* B65h *29/12*
U.S. Cl. 156—556                                            7 Claims

ABSTRACT OF THE DISCLOSURE

A tipping machine which receives separate supplies of sheets or laminated sheet units and moves them progressively through separate paths into a single converging path where the separate sheets or sheet units are brought into superimposed registry and are caused to contact. Adhesive applying means is provided on the machine for applying adhesive to preselected areas of the sheets, just prior to their coming in contact, so that after contact, they will be adhesively secured together for subsequent use as an assembly of sheets.

GENERAL DESCRIPTION AND OBJECTS OF THE MACHINE

The machine of the present invention may be termed a collating and tipping machine in the terminology of the art and, as indicated, is designed to produce adhesively bound, laminated sheet units from separately fed supplies of sheets. The machine is particularly useful in connection with commercial printing operations where, for example, it is desired to insert and adhesively connect a separately printed advertisement sheet, "tear-out" printed post card, etc. within the pages of a multiple page magazine or brochure.

In general, the machine comprises a plurality of separate, sheet-advancing conveyors, each of which is designed to receive a supply of different sheets. The sheets are supplied individually and successively to each conveyor either by hand or by the Sheet Unstacking and Fanning Machine disclosed in my copending application Ser. No. 666,306, filed Sept. 8, 1967, now U.S. Pat. No. 3,459,420. The sheet-advancing conveyors are preferably of the endless belt type and are preferably driven continuously. At a suitable advanced position, the conveyors are brought into converging relationship and are so arranged that the separate sheets carried thereby are brought into superimposed relationship and in exact registry in a predetermined manner. One or more of the conveyors is provided with an adhesive-applying unit located just ahead of the position where it converges with the adjacent conveyor so that as these sheets are advanced past the unit, adhesive will be applied thereto in a proper manner along selected areas and then when these sheets are brought successively into contact with the sheets supplied successively by the adjacent conveyor, they will adhere thereto. Suitable pressure means is provided at the converging paths of the conveyors for pressing the superimposed registered sheets together to produce the bound laminated unit. Means is provided for timing movement of one conveyor relative to the adjacent cooperating conveyor to thereby insure registry of the separate sheets. Automatic controls are associated with the separate conveyors for controlling the loading of sheets onto the separate conveyors in timed relationship to each other. These controls are adjustable to vary the loading intervals and the adjustment includes means which can be selectively operated while the conveyors and associated units of the machine are in motion. The registry means provided for the respective conveyors engages the sheets and causes the successive sheets advanced by one conveyor to move into exact registry with the sheets on the cooperating conveyor brought into converging relationship therewith. Means is provided in cooperation with the registry means of the conveyors for adjusting the registering phase on one conveyor relative to the other cooperating conveyor and this includes means which can be operated while the conveyors and associated units of the machine are in motion. Also, as a safety factor, sheet-detecting means is associated with each conveyor just ahead of the adhesive-applying station, to prevent operation of the adhesive-applying unit whenever a sheet is missing from either conveyor. This will ensure that adhesive will only be fed when all the sheets to be combined in a single laminated unit are properly supplied.

BRIEF DESCRIPTION OF DRAWINGS

In the accompanying drawings, there is illustrated one form of machine embodying this invention but it is to be understood that details of structure may be varied without departing from basic principles of the invention.

In these drawings:

FIG. 1 is a schematic illustration in side elevation of the machine embodying this invention.

FIG. 2 is an enlarged plan view taken from the position indicated at line 2—2 of FIG. 1 showing a portion of one of the sheet-advancing conveyors and associated feed-timing and registering means.

FIG. 3 is a transverse vertical sectional view taken along line 3—3 of FIG. 2 showing one of the sheet feed belts and cooperating sheet hold-down means.

FIG. 4 is a longitudinal vertical sectional view taken along line 4—4 of FIG. 2 showing the sheet-registering means and timing belt arrangement of the conveyor.

FIG. 5 is a longitudinal vertical sectional view taken along line 5—5 of FIG. 2 and showing cam-actuated timing means, with adjusting means therefor which controls the feeding or loading means for the sheet-advancing conveyor and also showing the sheet-registering means.

FIG. 6 is a transverse vertical sectional view taken along line 6—6 of FIG. 5.

FIG. 7 is a plan view taken from the position indicated at line 7—7 of FIG. 1 and showing a portion of the other sheet-advancing conveyor, with associated feed-timing control mechanism, at the position where it converges with the first sheet-advancing conveyor, the timing control mechanism also controlling the adhesive applying unit.

FIG. 8 is a side elevational view of the mechanism of FIG. 7 taken from the position indicated at line 8—8 of FIG. 7.

FIG. 9 is a vertical transverse sectional view taken along line 9—9 of FIG. 8 showing the adhesive-applying nozzle and associated pressure rolls.

FIG. 10 is a vertical longitudinal sectional view taken along line 10—10 of FIG. 7 showing the convergence of the two sheet-feeding conveyors with the timing belt arrangement for maintaining registry of the sheets.

FIG. 11 is a vertical longitudinal sectional view taken along line 11—11 of FIG. 7 showing cam-timing means with adjusting means for controlling the feeding or loading of the second sheet-advancing conveyor.

FIG. 12 is a vertical longitudinal sectional view taken along line 12—12 of FIG. 7 showing the cam and switch control for the adhesive-feeding unit.

FIG. 13 is a vertical longitudinal sectional view taken along line 13—13 of FIG. 7 showing the converging conveyors and the associated timing belts and sheet-detecting means.

FIG. 14 is a schematic view in perspective illustrating the feed of the two sheets by the separate conveyors into converging superimposed registry and the adhesive being applied just before they are pressed together to cause them to adhere.

FIG. 15 is an isometric view, partly cut away, showing the laminated sheet assembly produced by the machine.

FIG. 17 is a side elevational view illustrating different adjusting means for the sheet-feeding and sheet-registering means.

DETAILED DESCRIPTION OF DRAWINGS

Figure 16:
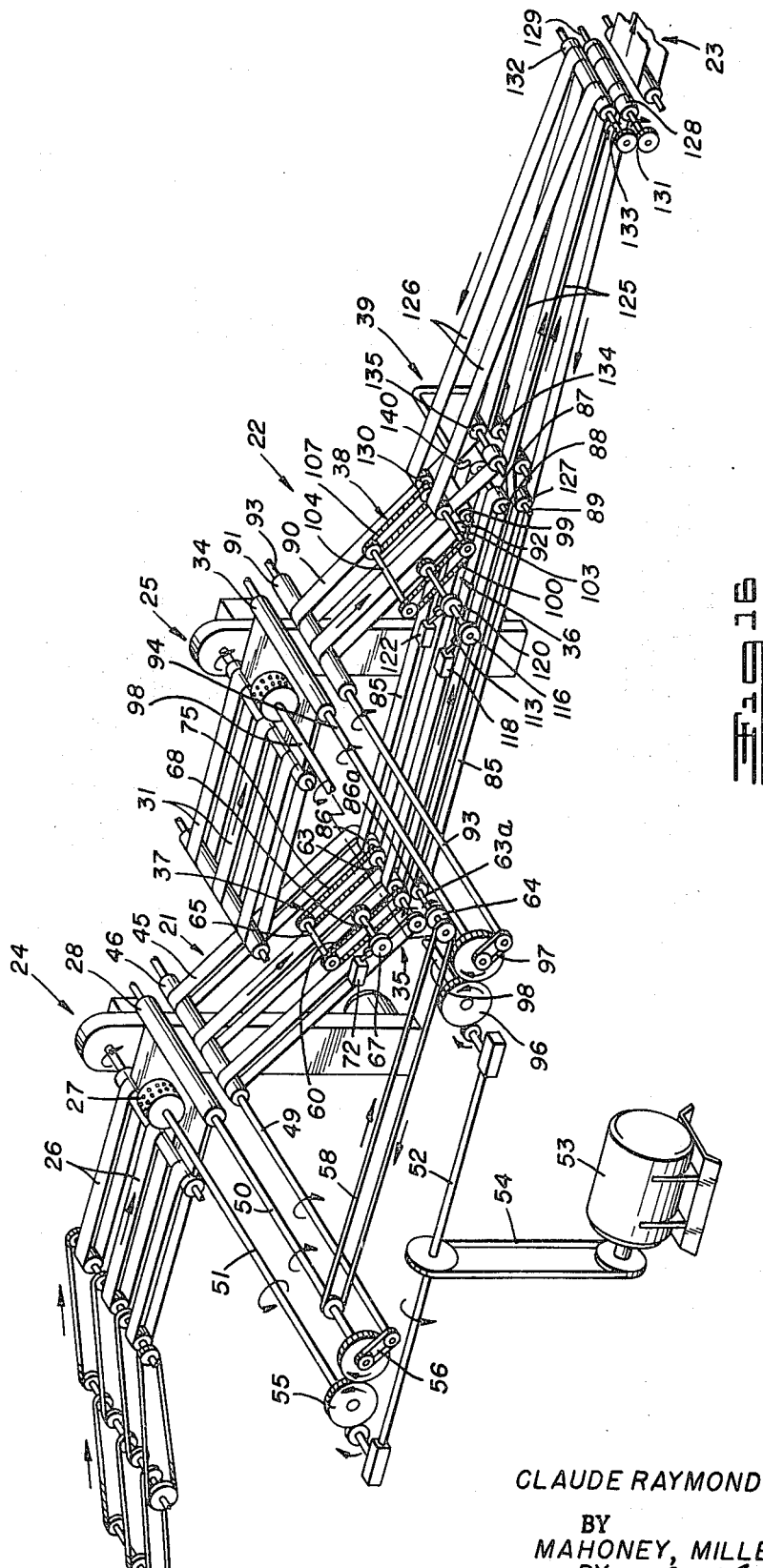
FIG. 16 is a schematic view in perspective of the conveyors and drive arrangement therefor.

With specific reference to the drawings, it will be noted that the machine is shown generally in FIG. 1 as comprising a first sheet-advancing conveyor 21 and a separate, second sheet-advancing conveyor 22, which are fed or loaded with different types of sheets, and which converge into superimposed relationship where the sheets are brought into laminated adhered relationship and discharged onto an unloading conveyor 23. Each of the conveyors 21 or 22 may be fed by hand or automatically with individual sheets or sheet-units, but in the example shown there is illustrated an automatic feed-unit 24 for the conveyor 21 and a manual feed unit 25 for the conveyor 22. The feed-unit 24 may be of a suitable type such as the sheet unstacking and fanning unit disclosed in my aforesaid copending application and as disclosed therein may comprise conveyor mechanism 26 which separates and fans out the sheets and a vacuum-controlled take-off drum 27 which will take off the sheets and feed them successively between the rolls 28 and 29 to the conveyor 21. The unit 25 may include a table 30 for supporting a stack of the sheets and an associated conveyor 31 upon which the sheets may be placed individually and successively for feed to the vacuum take-off drum 32, like the drum 27, and then in between the cooperating rolls 33 and 34 before they are supplied to the conveyor 22. The conveyors 21 and 22 are preferably of the continuously driven endless type. The conveyors 26 and 31 of the feed units may be intermittently or continuously driven and the associated vacuum drums 27 and 32 and associated respective pairs of rolls 28–29 and 33–34 will be correspondingly driven. The unloading conveyor 23 may be continuously or intermittently driven. In addition to the units generally referred to above, a feed-timing unit 35 (FIG. 2) is located in cooperation with the conveyor 21 and a similar unit 36 (FIG. 7) is located in cooperation with the conveyor 22 being at positions in advance of the converging position of the conveyors. In the same positions longitudinally of the respective conveyors 21 and 22 as the timing units 35 and 36 are the respective sheet-registering units 37 (FIG. 4) and 38 (FIG. 7). Also, an adhesive-applying unit 39 is provided in cooperation with the lower conveyor 21 in the example shown, where it is located in advance of the converging position of these conveyors and this unit is also controlled by the timing unit 36.

The sheets fed to the lower conveyor 21 are designated by the letter L and those fed to the upper conveyor are designated by the letter U. It is to be understood that different numbers of sheets or sheet units can be combined and the number of conveyors and associated sheet-feeding units will vary in accordance with the number of sheets collated and all the conveyors will come together at the converging position. The adhesive-applying units will be used in proper numbers and will be properly located to apply adhesive between the various sheets to be superimposed into the final unit designated by the letter F in FIG. 15.

The details of all the units referred to generally above will now be described.

The sheet-advancing conveyor 21 is illustrated best in FIGS. 1–5 and 16 and includes a downwardly and forwardly inclined in-feed section which embodies a plurality of laterally spaced, parallel endless belts 45. The belts 45 pass around a transverse upper and rear drive roll 46, which is spaced slightly below and forwardly of the roll 28 of the feed unit 24 and in slightly angular relationship thereto, and around a lower idler roll 47 keyed on a transverse shaft 48. The roll 46 is mounted on a transverse driven shaft 49 which is disposed in slightly angular relation to a shaft 50 (FIG. 16) upon which the roll 28 is mounted and this shaft is parallel to a shaft 51 which carries the vacuum drum 27. These shafts are driven from a longitudinally extending drive shaft 52 which is driven by a drive motor 53 by means of a chain and sprocket drive 54. The shaft 52 drives the shafts 49, 50, and 51 through a train of gears 55 and a chain and sprocket drive 56. Thus, the rolls 28 and 46 and the drum 27 will be driven in timed relationship. It will be noted (FIG. 2) that the rolls 46 and 47 have their axes parallel but at an angle to the main center line or longitudinal axis of the conveyor 21. The result is that the belts 45, though parallel with each other, are at an angle to that longitudinal axis.

The vacuum drum 27 will serve to take the sheets individually from the unit 24, feed them down between the rolls 28 and 29 which will then feed them onto the belts 45 of the conveyor 21. It will be noted that the upper runs of these belts pass over a suitably supported plate 57 (FIGS. 2 and 3).

The feed-timing unit 35 and the sheet-registering unit 37 are disposed above the upper runs of the belts 45. The unit 35 comprises a chain 60 which is spaced above the belts 45 and which passes around the sprockets 61 and 62. The sprocket 61 is carried by a transverse shaft 63 disposed above and forward of the shaft 48 (FIGS. 1, 2 and 5) and at an angle to that shaft since it is a right angle to the longitudinal axis of the conveyor 21. The shaft 63 is driven from the shaft 63a (FIG. 5) by means of the meshing gears 64. The shaft 63a will be referred to later in detail and it is driven from the shaft 50 by means of a sprocket and chain drive 58. The sprocket 62 is carried by a suitably supported transverse shaft 65 parallel to the shaft 63 and rearwardly and upwardly thereof and at a right angle to the axis of the conveyor 21, and the shaft 65 will be driven at the same speed as the shaft 63. The upper run of the chain 60 (FIGS. 5 and 6) engages with a sprocket 66 which carries a cam 67, being mounted for rotation as a unit about the axis of a stub shaft 68 carried by an upstanding bracket 69 which is supported for vertical adjustment by a bolt and slot connection 70 to adjust the pressure of engagement between the sprocket 66 and the chain 60. The cam 67 is in engagement with a follower carried by the switch arm 71 of an electric switch 72 which, in turn, controls the electromagnetic valve 73 (FIG. 1) that controls the application of vacuum to the take-off drum 27 of the sheet-feed unit 24. The switch 72 is mounted on a pivot arm or bracket 72a which is frictionally and pivotally mounted on the stub shaft 68. Gross adjustments of the timing of the actuation of the switch 72 and, therefore, the vacuum control valve 73 may be varied by releasing the cam sprocket 66 from the chain 60, by means of vertical adjustment of the bracket 69, and then turning the cam 67 about the axis of the shaft 68 and then re-engaging the sprocket and chain. A similar adjustment may be made if the sprocket and cam are held in an adjusted angular position on the shaft by a friction type setscrew which permits rotative adjustment about the shaft. Fine adjustments of the timing of the actuation of the switch 72 may be made while the machine is running by moving the switch-supporting bracket 72a and switch 72 angularly around shaft 68.

The sheet-registering unit 37 may comprise one (as indicated schematically in FIG. 16) or a plurality of sprocket chains 75, for example a pair, disposed above the belts 45 in longitudinally extending, laterally spaced, parallel relationship and parallel to the axis of the conveyor 21 but at an angle to the belts 45 thereof (FIG. 2). Each of the chains 75 passes around a sprocket 76 which is bushed and turns freely on the shaft 63 and a sprocket 76a keyed on the shaft 65 and, thus, the chains are driven by the shaft 65 which, in turn, is driven by the chain 60 from driven shaft 63. Each of the chains 75 (FIG. 4) carries depending sheet-engaging stop dogs or lugs 77 at spaced positions along the chain, the lugs on one chain being in transverse alignment with the corresponding lugs on the other chain. When the lugs are on the lower runs of the chains 75 they will extend down below the associated upper runs of the conveyor belts 45 into slots 57a (FIG. 4) cut into the plate 57. As indicated in FIG. 4, as a sheet L is moved by the belts 45 beneath the chains 75, the lugs 77 will be in dependent position to be engaged by the leading edge of the sheet to locate it in a proper position on the conveyor for subsequent registry with a sheet U supplied by the upper conveyor 22. The belts 45 are driven at a faster linear speed than the chains 75 so that the sheets L will be positively pushed against the locating or registering lugs 77. As previously described, the belts 45 are angled slightly toward the one side of the conveyor 21 relative to the main axis thereof and at that side there is provided a guide 83 which is parallel to the axis and which is supported for lateral adjustment by bolt and slot connections at 84.

In association with the unit 37, hold-down means is provided for holding the sheets down against the belts 45 as they are successively subjected to the registering dogs or lugs 77. This means is illustrated best in FIGS. 2 and 3 and comprises a supporting bar 80 which is spaced slightly above the level of the upper runs of the belts 45 and extends longitudinally parallel thereto. The bar is provided with a plurality of ball-receiving sockets located at longitudinally spaced intervals which receive the balls 81. The bar 80 is supported for lateral adjustment by bolt and slot connections at 82 and is positioned over one of the belts 45 at such a level that when a sheet L passes between the balls 81 and the belt 45 the balls are lifted slightly in their sockets so that the weight of the balls will act on the upper surfaces of the sheets to hold them down against the belts 45 but the balls will be free to rotate in their respective sockets and not interfere with advance of the sheets.

The successive longitudinal positions of the sheets L fed onto the conveyor 21 by the vacuum drum 27 of the unit 24 can be varied by changing the position of the cam 67 relative to the chain 60 which, in turn, will change the relationship between the cam and the position of the dogs or lugs 77 of the registering unit 37. This will cause the sheets to be fed onto the conveyor belts 45 in successive spaced, roughly predetermined positions but the lugs 77 will be engaged by the advanced sheets L so that the lugs will accurately position the sheets longitudinally on the conveyor belts for subsequent accurate registration with the upper sheets U. The angled belts 45 will feed the sheets L toward one side of the conveyor against the guide strip 83 which will accurately register them laterally of the conveyor before the sheets engage the lugs 77.

From the registering unit 37, the sheets L are positively fed between a pair of positively driven, endless timer belts 85 which will positively grip the sheets and maintain their longitudinal spacing. These belts, as shown best in FIGS. 1, 2, 4, 10 and 16, are horizontally disposed and form a horizontal section of the sheet-advancing conveyor 21. The belts are divided into a lower set and an upper set of laterally spaced, parallel belts. The upper set passes around and meshes with rear drive pulleys 86 which are keyed on the shat 63 at axially spaced positions and around similar forward driven pulleys 87 disposed on a transverse shaft 88 which is suitably supported forwardly of the shaft 63 in parallel relationship to the shaft 63 and at the same level. Similarly, the lower set of belts 85 passes around and meshes with the rear drive pulleys 86a keyed on the shaft 63a, which is supported in a common transverse vertical plane with the shaft 63 and parallel thereto, and the forward driven pulleys 87a keyed on a transverse shaft 89 supported directly below the shaft 88. Since the shaft 63 and the shaft 63a are positively driven at the same speed by the drive 58 and meshing gears 64, the belts 85 will also be driven at the same linear speed. As previously indicated, the sprockets 76 turn freely on the shaft 63 and are so designed that they are of smaller pitch diameter than pulleys 86 and, therefore, rotate at a faster rate. This smaller pitch diameter allows for clearance for chains 75 when they are transferring registered sheets L to the nip of the belts 85 carried by the pulleys 86 and 86a. Thus, the registered sheets L will be fed between and gripped by the belts 85 and will be positively advanced in their previously longitudinally spaced relationship.

As previously indicated, the sheet-advancing conveyor 22 receives the sheet U successively from the feed-unit 25 by means of the vacuum take-off drum 32. This conveyor is illustrated best in FIGURES 1, 7, 10–13, and 16, and includes a downwardly and forwardly inclined feed-in section, similar to the feed-in section of the conveyor 21, but which is directed into converging relationship with the horizontal portion of the conveyor 21. It will be noted that the unit 25 is disposed over the position where the inclined belts 45 of the conveyor 21 merge with the horizontal belts 85 thereof and the feed-in section of the conveyor has endless belts 90 which extend substantially from the drum 32 downwardly and forwardly to a point just ahead of the belts 85.

The belts 90 are substantially identical with the belts 45 and are similarly supported, passing around an upper and rear drive roll 91 and around a lower idler roll 92. They are also angled laterally relative to the main center line or axis of the conveyor 22 toward a laterally adjustable sheet guide bar 99 at one side thereof corresponding to the side of the conveyor 21 where the sheet guide bar 83 is located. The roll 91 is carried by a transverse shaft 93 supported forwardly of and in slightly angular relation to the shaft 94 which supports the roll 34 of the feed-unit 25 (FIGURE 16). The roll 92 is supported on a transverse shaft 95 suitably supported at a forward lower position in parallel relationship to the shaft 93. The longitudinal drive shaft 52 also drives through a chain of gears 96 and a sprocket and chain drive 97 (FIGURE 16) adjacent its forward end, the shafts 93 and 94 and the drum shaft 98. Shaft 98 carries and drives the vacuum drum 32 and shaft 94 carries and drives the associated roll 34. Thus, the three shafts 93, 94 and 98 are driven in timed relationship.

The timing unit 36 is similar to the unit 35 associated with the conveyor 21 and the registering unit 38 is similar to the unit 37 associated with the conveyor 21. These two units 36 and 38 are disposed above the upper runs of the belts 90.

The unit 36 is shown in FIGURES 7, 11 and 12 and comprises the sprocket chain 100 which passes over the forward sprocket 101 and the rear sprocket 102. The sprocket 101 is carried by a driven shaft 103 which is transversely supported at a right angle to the longitudinal axis above and forward of the roll 92 and at an angle to the axis thereof. The sprocket 102 is carried by a shaft 104 which is supported rearwardly and upwardly of the shaft 103 in parallel relationship thereto. These shafts also carry the sprockets 105 and 106, respectively, of the registering unit 38 and which includes the chain 107 passing therearound which carries the sheet-registering dogs 108 as in the unit 37 provided in association with the conveyor 21. However, it will be noted, in this example, that only one chain 107 is provided and the dogs or lugs 108 thereof will successively pass down into cooperation with an adjacent belt 90 and into the slot 109a (FIGURE 13) in the support plate 109 disposed therebeneath. The shaft 103 drives the chain 100 of the unit 36, chain 100 drives the shaft 104, sprocket 106, chain 107 and sprocket 105 which is bushed and turns freely on the shaft 103, similar to the sprocket 76 in the unit 37. The unit 38 has a sheet hold-down means including the laterally adjustable bar 111 that carries the balls 112a, this arrangement being like the bar 80 and balls 81 of the unit 37 provided in association with the conveyor 21. This means will serve to hold down the sheets as they are subjected to the dogs 108 on the chain 107, against which the sheets will be pushed by the belts 90 which travel at a greater linear speed than the chain 107.

The chain 100 of the timing unit 36 meshes with a sprocket 112 which is carried by a transverse stub shaft 113 (FIGURE 7) supported on the upper end of the bracket 114 which is mounted for vertical adjustment by the bolt and slot connection 115 (FIGURE 11) which permits engagement and disengagement of the chain 100 and the sprocket 112. A cam 116 is provided as part of the sprocket 112 and engages with the follower on a switch arm 117 of an electric switch 118. This switch 118 is in circuit with an electromagnetic valve 119 (FIGURE 1) which controls the application of vacuum to the drum 32 of the sheet feed-unit 25. This arrangement is like the cam 67 previously mentioned which controls the vacuum drum 27 of the feed-unit 24. In addition, the shaft 113 carries a second cam 120 which engages with a follower carried by the switch arm 121 (FIGURE 12) of an electric switch 122 which, in turn, controls an electromagnetic feed control valve 123 (FIGURE 1) on the adhesive-supplying unit 39. The switch 118 is carried by an arm which is adjustably mounted by an arcuate bolt and slot connection 124 in which the slots are concentric with the axis of the shaft 113 so that the cam follower 117 can be adjusted around the cam 116. The connection 124 is preferably of the friction type so that the support arm can be tapped to different positions during operation of the machine. Thus, the cam-controlled timing means will control timing of the feed-unit 25 and the adhesive unit 39 and this timing can be varied relative to the advance of the sheets U by the belts 90, by adjusting the sprocket 112 out of mesh with the chain 100 and then varying the rotative positions of the cams 116 and 120 simultaneously. Also, the cams may be held on their respective shafts by friction type setscrews which will permit relative adjustment about the shafts. Fine adjustment of the timing of the feed unit 25 can be accomplished during operation of the machine by adjusting the follower 117 about the cam 116. Since the cams are driven by the shaft 103, the adjustment of the cams will vary the timing of the supply of sheet U to the conveyor 22 relative to the position of the dogs 108 and the actuation of the adhesive unit 39 relative to the longitudinal spacing of the sheets on the conveyor. The position of the dogs 108 relative to the belts 90 may be adjusted by disengaging the sprocket 112 from the chain 100 and moving the chain 107 manually longitudinally or, if the sprocket is mounted by a friction type setscrew, by rotation the sprocket to a different position about the shaft.

Beyond the in-feed belts 90 of the conveyor 22 and the timing belts 85 of the conveyor 21, the conveyors are provided with converging sections, as shown best in FIGS. 1, 7, 8, 10, 13, 14, and 16, and which comprise a set of lower timing belts 125, for receiving the lower sheets L from the belts 85 of conveyor 21, and an upper set of timing belts 126 for receiving the sheets U from the belts 90 of the conveyor 22, the sets of belts converging with each other so as to cooperate to bring the sheets into superimposed relationship. Each set of the belts 125 and 126 comprises separate endless belts longitudinally disposed in laterally spaced relationship. The lower belts 125 (FIGS. 1 and 10) pass around and mesh with rear driving pulleys 127 keyed on the transverse shaft 89, in axially spaced positions, and around forward driven pulleys 128 keyed on a transverse shaft 129 located forwardly of and in substantially the same horizontal plane as the shaft 89 and in parallel relationship thereto. Similarly, the belts 126 pass around driven pulleys 130 (FIGS. 7 and 10) keyed on the transverse shaft 103 and also around the forward driving pulleys 132 (FIG. 1) keyed on a transverse shaft 133 located above and parallel to the shaft 129. In addition, the belts 125 pass upwardly and forwardly over the driven pressure pulleys 134 and the belts 126 pass downwardly and forwardly under the driven pressure pulleys 135. These pulleys 134 and 135 are disposed in cooperative relationships so as to direct the belts into converging relationship, as indicated at 136 in FIG. 10, and then under pressure into horizontal opposed contacting relationship, along the area indicated at 137, until the discharge or unloading conveyor 23 is reached. In addition to the pulleys 134 and 135, an idler guide roll 138 (FIG. 10) is provided just beyond the shaft 88 (FIG. 13) which presses against and bends downwardly the belts 125 and an idler guide roll 139 is provided just beyond and below the shaft 103 which presses against and bends upwardly the belts 126. A pressure idler roll 99 is provided directly below the pulleys 130 with its axis in a common transverse vertical plane with the axis of the shaft 103. The roller 99 engages the belts 126 to provide gripping means for receiving the registered sheets U from the belts 90. As indicated, the sprocket 105 turns freely on the shaft 103 and is designed to be of smaller pitch diameter than the pulleys 130 so that it rotates at a faster rate. This smaller pitch diameter allows for clearance for chain 107 when transferring a registered sheet U to the nip between the roll 99 and the belts 126. This arrangement will provide a converging section for the two sheet-advancing conveyors 21 and 22 to bring the sheets U and L in superimposed registered position and a horizontally extending sheet-gripping section which will keep the superimposed sheets U and L in proper registry. The belts 125 are driven by means of the pulleys 127 keyed on the shaft 89. These belts drive the pulleys 128 keyed on the shaft 129. The shaft 129, in turn, drives the shaft 133, through gearing 131 (FIG. 16) and this shaft has the pulleys 132 keyed thereon which drive the belts 126. The belts 126 drive the pulleys 130, keyed on the shaft 103 and, therefore, the shaft 103 which operates the timing unit 36 and the sheet-registering unit 38 in the same manner described above.

The adhesive-applying unit 39 may be of any suitable type and includes the nozzle 140 which is directed downwardly over the path of movement of one of the sheets, being the lower sheet L in the illustration. This nozzle is located in the converging space 136 of the conveyors being located just behind the pressure pulleys 134 and 135 (FIGS. 8, 9 and 14). Thus, the adhesive will be applied to the upper surface of the lower sheet L just before the sheets are brought together and the feed of adhesive will be controlled and timed by actuation of the control valve 123, previously mentioned, which is associated with the nozzle.

It is desirable to prevent application of the adhesive unless the two sheets U and L are brought into cooperation and, therefore, means is provided for detecting whether or not both sheets are present and preventing operation of the supply valve 123 unless both are present. This sheet-detecting means is illustrated best in FIGS. 1, 7, 8, and 13. For the lower conveyor 21, it comprises a detecting finger or trigger 141 having a portion projecting up into the path of movement of sheets L carried by the belts 125 and located just ahead of the nozzle 140. This trigger, when engaged, will actuate a normally-open electric switch 142 which will be connected in series with the cam-actuated switch 122 which controls the feed valve 123 of the adhesive unit 39. Similarly, for the upper conveyor 22, the detecting means comprises a trigger 143, located directly above the trigger 141, projecting down into the path of movement of the upper sheets U advanced by the belts 90 and controlling a normally-open switch 144 which is also connected in series with the switch 122. Thus, unless both sheets U and L are present, the circuit to the adhesive supply valve 123 will not be made.

OPERATION OF THE MACHINE

Assuming the sheet feed-units 24 and 25 have been provided with a supply of the respective sheets L and U, the machine is started and preferably the sheet-fed conveyors 26 and 31 will be continuously driven and the sheet-advancing conveyors 21 and 22 will be continuously driven along with the vacuum take-off and feed drums 27 and 32 which will be continuously rotated. The unit 24 will automatically fan out the supply of sheets L on the conveyor 26 and feed them into position to be picked-up successively by the vacuum drum 27 and be fed thereby to the conveyor 21. The unit 25 will have a supply of the sheets U which will be manually fanned out on the conveyor 31 which will feed them into association with the vacuum pick-up drum 37 which will pick them up and feed them successively to the conveyor 22. The timing of the pick-up by the drum 27 relative to the sheet-advancing movement of the conveyor 21 will be controlled by the cam 67 of the timing unit 35 associated with that conveyor and this timing can be selectively varied as described. The timing of the pick-up by the drum 32 relative to the sheet-advancing movement of the conveyor 22 will be controlled by the cam 116 of the timing unit 36 associated with that conveyor and this timing can be selectively varied as described. Time adjustments of the feeding by either vacuum drum can be adjusted even during movement of the associated conveyor as previously described. Thus, the feed of the sheets L and U to the respective conveyors 21 and 22 can be selectively varied relatively to obtain a predetermined longitudinal spacing of the sheets on each conveyor. Accurate longitudinal positioning of each of the sheets on its respective conveyor before the conveyors canverge is brought about by the registering unit 37 provided on the conveyor 21 and the registering unit 38 provided on the conveyor 22. The phase of the movement of the dogs 108 of the registering unit 38, relative to the sheet-advancing belts 90, is usually fixed. However, the phase of the movement of the dogs 77 of the registering unit 37 relative to the sheet-advancing belts 45 is adjustable by advancing or retarding the chains 75 which will advance or retard the dogs relative to the belts 45. This can be done, as previously indicated, even during operation of the machine and will make it possible to adjust the phase of the registering unit 37 exactly with that of the unit 38 so as to accurately register the sheets L and U as they are brought together by the converging sections of the conveyors 21 and 22. The sheets L and U are urged first against the side guides 83 or 89, respectively, then down along the guides to engage the rearward surfaces of the advancing lugs 77 or 108, respectively, by the cooperation of angled belts 45 or 90 and the weight of the balls 81 or 112 pressing the respective sheets L and U against the upper support surfaces of the associated belts. Thus, a forward and sideward drive is supplied for the respective sheets L and U from the vacuum drums 27 and 32 to engagement first with the registering units 37 and 38 and on until the sheets are pinched and carried forward by the belts 85 of conveyor 21 and the belts 126 and cooperating roll 99 of the conveyor 22. This operation of the sheets U and L being brought into converging relationship is indicated best in FIG. 14. Before the sheets U and L actually move into superimposed relationship, the adhesive-supply unit 39 is actuated to apply adhesive to the upper side of the adjacent sheet L. The application of adhesive is timed by means of the cam 120 of the unit 36 and the adhesive is applied just before the sheets are brought into contact between the pressure pulleys 134 and 135. However, as previously indicated, unless the detecting means 141 and 143, associated with the respective conveyors 21 and 22, detect the presence of a sheet L on the belts 85 of the conveyor 21 and a sheet U on the belts 90 of the conveyor 22, the adhesive-supplying unit 39 will not be actuated. After the adhesive is applied, the two sheets L and U are brought into superimposed relationship, pressed between the pulleys 134 and 135 and then moved on between the cooperating straight horizontal portions of the belts 125 and 126 which will hold the registered sheets U and L in superimposed registered relationship until the adhesive sets and produces the final laminated bound assembly F, indicated in FIG. 15. The assemblies F will be discharged successively onto the unloading conveyor 23, which also will preferably be continuously driven, which will conduct them to a selected location.

A different form of mechanism for adjusting the phase of one sheet-registering unit relative to the other is illustrated in FIG. 17 along with a different form of mechanism for adjusting the timing of the associated vacuum type sheet-feeding means. This mechanism may be substituted in the drive of the unit 38 for controlling its phase and in the drive of the vacuum drum 32 for controlling its timing, although it could be substituted as well for controlling the phase of the unit 37. Corresponding parts of the drive are indicated by the same numerals with the suffix "b" and are located between the shaft for the vacuum drum 32 and the shaft for the upper belt 126. The mechanism is illustrated more or less schematically. As before, there is provided a drive to the vacuum drum shaft 98b as well as the roller shaft 94b which drives the chain 97b that drives the roller shaft 93b. In this instance, the shaft 98b also drives a sprocket chain 150 through a sprocket 151 keyed thereon and this chain passes around an idler 152 and around a pinion 153 keyed on the shaft 104b. A chain 100b passes around a sprocket 102b on the shaft 104b and a sprocket 101b on the shaft 103b. The registering chain 107 is carried by the shafts 103b and 104b, as before, and the adjusting mechanism will advance or retard the chain 100b and, therefore, the chain 107.

The mechanism for advancing or retarding the dogs 108 carried by the chain 107, relative to the belts 90, comprises the screw 155 which is mounted for vertical adjustment on the machine frame and is pivoted at its lower end to an arm 156 which is pivoted to the frame for vertical swinging movement and carries an idler sprocket 157 on its free end which meshes with the lower run of the chain 100b. The upper run of the chain is tensioned by an adjustable idler sprocket 157 which is carried by an arm 158 pivoted to the frame for vertical swinging movement and suitably releasably held (not shown) in adjusted position. By rotating the screw 155 the lower or driving part of the chain may be pulled upwardly or allowed to sag to rotate the shafts 103b and 104b about their respective axes which will result in advancing or retarding the lugs 108 in phased relationship with the dogs 77 on the chains 75. This adjustment can be made any time even during operation of the machine.

A similar adjustment is provided for the drum shaft 98b to advance or retard the drum shaft and the position of which will control the time of actuation of the vacuum pick-up by the drum 32. This is accomplished with the screw 155a which controls the sprocket 157a, mounted on arm 156a, that engages the chain 150 at its lower or driving run. Vertical movement of the pinion 157a will advance or retard the drum shaft 98b and the drum it carries and will phase it in relationship to vacuum drum 27 on shaft 51. A tensioning pinion 157a, mounted on arm 158a, is also associated with the chain 150 at its upper run.

Thus, this adjusting mechanism provides means which can be selectively actuated even during operation of the machine for changing phasing of the vacuum pick-up unit or phasing of the registering unit. Obviously, this mechanism can be associated with either conveyor and is not limited to use with the one shown.

It will be apparent from the above that the machine of this invention will receive supplies of different type sheets, and move them into superimposed registered relationship after applying adhesive to at least one of the surfaces of the sheets to be brought into contact. The machine may be adjusted to register sheets of different lengths and widths. The in-feed of sheets is timed in accordance with movement of the respective conveyors and can be varied in accordance with variations in length of sheets. The registering means can also be adjusted in accordance with variations in length of the sheets. These adjustments can be made in regard to either or both conveyors and may be made while the machine is operating.

Various other advantages will be apparent.

Having thus described this invention, what is claimed is:

1. A machine for adhesively joining a plurality of sheets comprising: a plurality of power driven, sheet-conveying means having relatively separated inlet ends and relatively convergent discharge ends and operable to advance continuously at least two streams of sheets longitudinally into confluence; sheet-feeding means positioned adjacent the inlet ends of each of said sheet-conveying means for feeding sheets in continuous succession to each of said sheet-conveying means; adjustable timing means connected with said sheet-feeding means and operable to control the intervals of feeding of sheets to said sheet-conveying means; sheet-registering means positioned intermediate the ends of each of said sheet-conveying means and movably engageable with sheets being advanced by each of said sheet-conveying means for positioning the sheets being advanced by one of said conveying means in a given relation to the sheets being advanced by another of said conveying means; control means connected with said sheet-registering means and adjustable during operation of said machine to vary the positional relationship of sheets being advanced by each of said conveying means; adhesive-applying means positioned adjacent the convergent discharge ends of said conveying means and normally operable to apply a quantity of an adhesive to the sheets advanced by one of said conveying means immediately prior to their confluence with the sheets advanced by another of said conveying means; and sheet-detecting means located along each of said conveying means and connected with said adhesive-applying means for rendering said adhesive-applying means inoperative in the absence of sheets at predetermined positions along each of said conveying means.

2. A machine according to claim 1, wherein the relatively convergent discharge end portions of each of said sheet-conveying means include continuous, flexible, non-slip, gear-type belts.

3. A machine according to claim 1, wherein said adhesive-applying means includes a valve-controlled ejection nozzle positioned adjacent the discharge end portion of one of said sheet-conveying means and arranged to forcibly eject a measured quantity of adhesive onto the sheets advanced by said one conveying means prior to their confluence with sheets advanced by another of said conveying means.

4. A machine according to claim 1, wherein each of said sheet-conveying means comprises separate, longitudinally adjoining sets of endless flexible belts, and wherein the belts adjacent the inlet ends of said sheet-conveying means are driven at higher linear speeds than the belts adjacent the convergent discharge ends of said sheet-conveying means.

5. A machine according to claim 4, wherein said sheet-registering means comprises chain-driven dogs movable into the paths of movement of sheets being advanced by the belts of the inlet end portions of said sheet-conveying means and engageable with the forward edges of such sheets, said dogs being continuously movable with the sheets engaged therewith during a portion of the travel of the sheets so as not to interrupt advancing movement of the sheets by said sheet-conveying means.

6. A machine according to claim 4, including guide means positioned along a side of each of said sheet-conveying means for positioning a side edge of the sheets advanced by one of said sheet-conveying means in predetermined relation to a side edge of the sheets being advanced by another of said sheet-conveying means.

7. A machine according to claim 6, wherein the belts adjacent the inlet ends of said sheet-conveying means are skewed toward said guide means.

References Cited

UNITED STATES PATENTS

| | | | |
|---|---|---|---|
| 2,525,612 | 10/1950 | McKay et al | 156—570 X |
| 2,539,401 | 1/1951 | Carl et al. | 271—76 X |
| 2,744,562 | 5/1956 | La Rocca et al. | 156—556 X |
| 2,850,195 | 9/1958 | Van Dam | 156—364 |
| 3,274,043 | 9/1966 | Schneider | 118—2 X |
| 3,348,519 | 10/1967 | Dyess et al. | 118—2 |
| 3,352,403 | 11/1967 | Blake | 198—34 |
| 3,366,222 | 1/1968 | Rowekamp | 198—34 |
| 3,378,430 | 4/1968 | Aizawa | 156—556 |

BENJAMIN A. BORCHELT, Primary Examiner

J. M. HANLEY, Assistant Examiner

U.S. Cl. X.R.

156—364, 571; 271—76